Aug. 3, 1943.   LE ROY LANGFORD   2,325,780
YIELDABLE COUPLING
Filed July 25, 1942
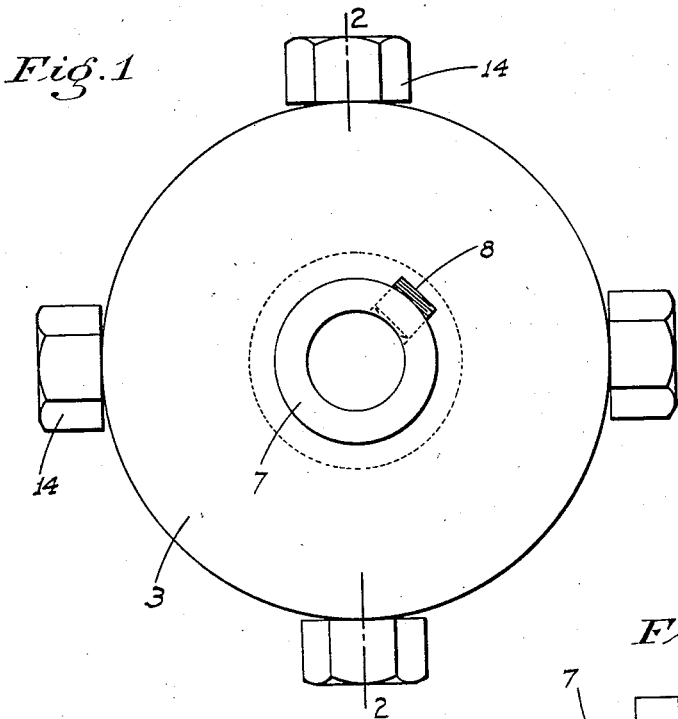
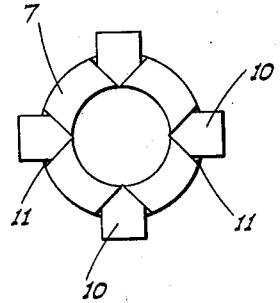
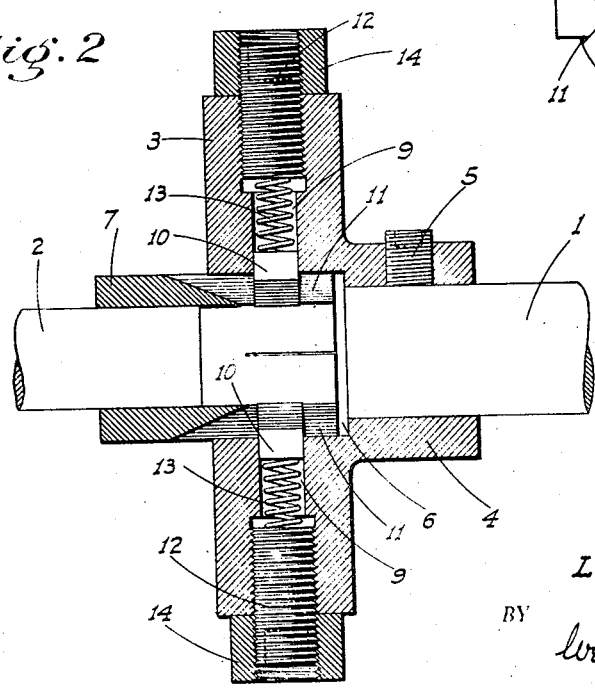
INVENTOR.
LeRoy Langford
BY
ATTORNEYS Patented Aug. 3, 1943

2,325,780

UNITED STATES PATENT OFFICE 2,325,780

YIELDABLE COUPLING

Le Roy Langford, Toccoa, Ga., assignor to R. G. Le Tourneau, Inc., Stockton, Calif., a corporation Application July 25, 1942, Serial No. 452,257

2 Claims. (Cl. 64—29)

This invention relates in general to a yieldable coupling adapted for connection between adjacent ends of a drive and a driven shaft, and in particular the invention is directed to, and it is an object to provide, a yieldable coupling adapted for connection between the drive shaft of a machine tool actuating motor and a driven shaft of said tool; the coupling being designed to release or overrun in the event of an excessive load on the driven shaft whereby to prevent damage to both the motor and driven parts of the tool.

The yieldable coupling herein shown and described is especially designed for connection between the drive motor and the adjacent driven shaft of a lathe tool slide drive mechanism, such as is shown in copending application for United States patent, Serial No. 391,736, filed May 3, 1941.

Another object of the present invention is to provide a yieldable drive coupling for adjacent shafts which includes a radial disc having a hub adapted for connection with one shaft, and a sleeve rotatably seated in an axial concentric bore in said disc and adapted for connection with the adjacent end of the other shaft; there being spring pressed detent mechanism between said disc and sleeve arranged to normally prevent relative rotation therebetween but operative to automatically permit such rotation in the event of the load on the coupling exceeding a predetermined amount.

An additional object of the invention is to provide a yieldable coupling, as in the preceding paragraph, in which said detent mechanism includes spring pressed tapered detents or dogs carried by the disc and seating in correspondingly formed grooves in the sleeve portion; there being means to adjust the spring pressure on said dogs and thereby regulate the load on the coupling required to free the dogs from the grooves and cause the coupling to overrun.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawing similar characters of reference indicate corresponding parts in the several views:

Figure 1 is an end view of the device.

Figure 2 is a sectional elevation on line 2—2 of Fig. 1.

Figure 3 is an end view of the sleeve and co-operating dogs, detached from the remainder of the device.

Referring now more particularly to the characters of reference on the drawing, the device is adapted for connection in driving relation between the adjacent ends of alined shafts 1 and 2; one of said shafts being the drive shaft and the other the driven shaft.

The coupling comprises disc 3 of substantial diameter and width disposed radially relative to said shafts and concentric thereto; said disc including a hub 4 into which the adjacent end of shaft 1 snugly projects, the end portion of the shaft being secured in the hub by means of a set screw 5.

The disc is formed with a circular bore 6 of substantial depth which opens to the face of the disc opposite hub 4. A sleeve 7 snugly but rotatably seats in bore 6; said sleeve projecting some distance beyond the disc. The adjacent end of the other shaft 2 projects into sleeve 6 and is secured therein by means of a set screw 8.

The disc 3 is formed with a plurality of circumferential and symmetrically spaced radial passages 9 which are open at their inner ends to the bore 6. A detent or dog 10 is slidably disposed in each passage 9, and at its inner end is symmetrically tapered in a plane circumferentially of the sleeve. These dogs seat in V-shaped, longitudinal grooves 11 of matching configuration formed in the sleeve and opening to the periphery thereof.

An adjustment screw 12 is threaded in the outer end of each passage 9 terminating at its inner end short of the corresponding dog 10; there being a compression spring 13 engaged under compression between each adjustment screw and dog. A lock nut 14 is threaded on the outer end of each adjustment screw and seats against the periphery of disc 3.

In operation, the adjustment screws 12 are run down so that an equal spring pressure is imparted to each of the dogs and to such extent that the dogs normally remain in the sleeve grooves holding the disc and sleeve in locked or driving relation, but yield and escape said grooves in the event of excessive load on the driven shaft, whereby the disc and sleeve overrun relative to each other during the period of the excessive load, but automatically return to locked or driving relation when said load is relieved. The use of replaceable shear pins or other similar elements as now used in safety drive couplings is entirely eliminated, thus avoiding considerable repair and maintenance expense as well as time loss. Also, the dog and cooperating groove arrangement allows for a certain amount of axial adjustment of the shafts relative to each other without disturbing the functioning of the device.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A yieldable drive coupling adapted for connection between adjacent ends of alined shafts, comprising a radially disposed disc of substantial thickness, an axial hub projecting from the disc adapted to be secured on the adjacent end of one shaft, the disc having an axial bore open to the side of the disc opposite the hub, a rotary sleeve engaged at one end in said bore with a running fit, the other end of the sleeve being adapted to receive and be secured to the adjacent end of the other shaft, a plurality of circumferentially and symmetrically spaced radial passages in the disc open to said bore, and spring pressed dogs slidable in said passages and engaging the sleeve, the latter having corresponding recesses in which said dogs normally but releasably seat, whereby the disc and sleeve are normally in driving relation; said sleeve being adjustable axially for a limited extent and relative to the disc, said recesses being longitudinal grooves.

2. A coupling as in claim 1 including a setscrew threaded through the sleeve and adapted to engage the portion of said other shaft within said sleeve; said longitudinal grooves being of substantially greater length than the corresponding dimension of the dogs.

LE ROY LANGFORD.